Dec. 7, 1926.
H. W. GAGE
OPHTHALMIC MOUNTING
Filed Nov. 8, 1924
1,609,871
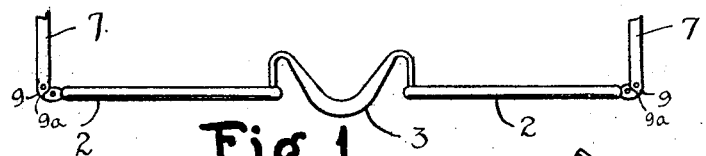
Fig. 1
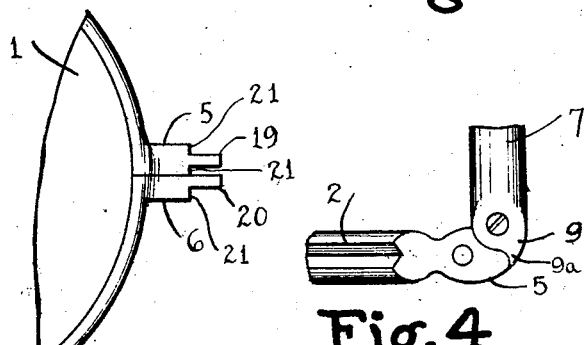
Fig. 2   Fig. 4
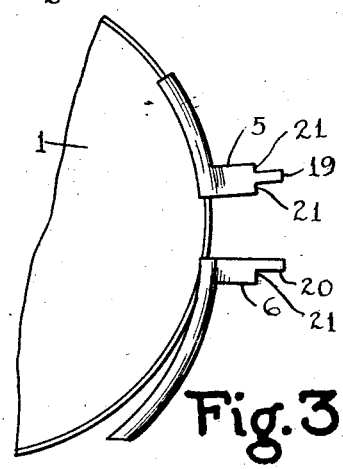
Fig. 3
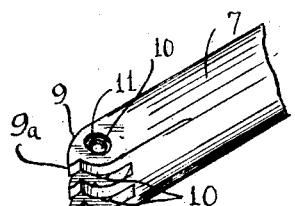
Fig. 5
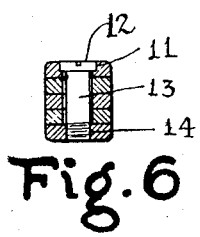
Fig. 6
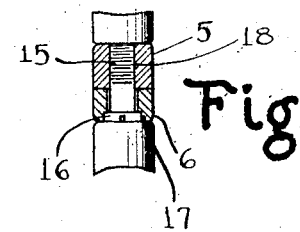
Fig. 7
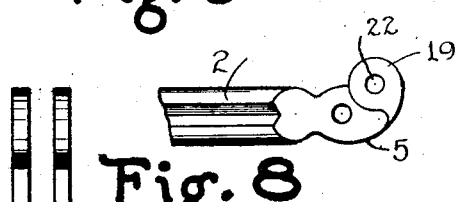
Fig. 8
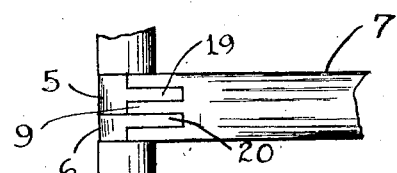
Fig. 9
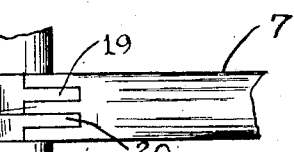
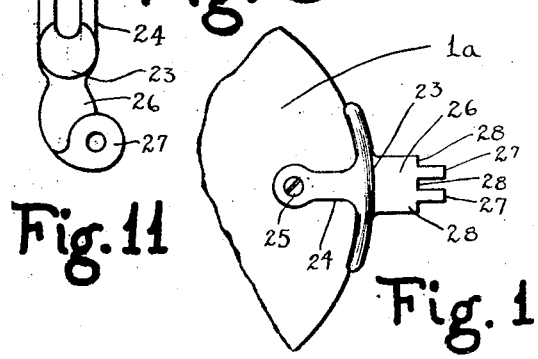
Fig. 11   Fig. 10
INVENTOR.
Harry W. Gage
BY
HIS ATTORNEYS.

Patented Dec. 7, 1926.

1,609,871

UNITED STATES PATENT OFFICE.

HARRY W. GAGE, OF ROCHESTER, NEW YORK, ASSIGNOR, BY MESNE ASSIGNMENTS, TO SHUR-ON-STANDARD OPTICAL COMPANY, INC., OF GENEVA, NEW YORK, A CORPORATION OF NEW YORK.

OPHTHALMIC MOUNTING.

Application filed November 8, 1924. Serial No. 748,773.

The present invention relates to ophthalmic mountings and more particularly to a connection between a temple and the supporting means on the mounting. An object of the invention is to provide in that type of mounting having a temple formed of pliable wire an improved construction in which the wire is pivotally connected to the supporting means in such a manner that the breaking of the temple adjacent the pivot due to a heavy mounting or use will be eliminated. A further object of the invention is to provide in that type of mounting where the temple embodies a wire, a pivotal connection with the mounting which will hold the split in the lens frames together through additional ears on the temple. Still another object of the invention is to provide a strong and durable joint between the temple and the lens frame in that type of mounting where the temple is made from a wire pivoted to the lens frame. A still further object is to provide a joint between the temple and the mounting so constructed that a maximum amount of bearing surface is provided in order that sufficient friction is obtained to prevent a loose or wobbly temple. Still another and further object is to make it possible to have a temple which may be as strong throughout its length as the supporting means of such temple on the mounting.

To these and other ends, the invention consists of certain parts and combinations of parts, all of which will be hereinafter described, the novel features being pointed out in the appended claims.

In the drawings:

Fig. 1 is a plan view of an ophthalmic mounting constructed in accordance with this invention;

Fig. 2 is a detail view showing a fragment of a frame with the terminals or end pieces secured together;

Fig. 3 is a similar view showing the terminals or end pieces separated;

Fig. 4 is an enlarged plan view;

Fig. 5 is a perspective view of one of the temple ends;

Fig. 6 is a section in the plane of the axis of the temple pivoting screw.

Fig. 7 is a section in the plane of the axis of the screw which secures the two end pieces together.

Fig. 8 is a view of the underside of one of the end pieces;

Fig. 9 is an enlarged side view of the joint between a temple and the frame; and Fig. 10 and Fig. 11 are detail views of another embodiment of the invention where the support is in the form of a mounting without a rim or what is known as a lens clamp.

In the illustrated embodiment of the invention, 1 indicates the lens and 2 the split groove rings in which the lens is received, said rings being connected by a bridge 3. The metallic rings 2 have on opposite sides of their split, terminals or end pieces 5 and 6 projecting outwardly and rearwardly from the ends of the split and providing supporting means to which temples are pivotally connected. The end pieces may be secured together by a screw 15 which passes loosely through the end piece 6 and has its head 16 seated in a countersunk portion 17 in such end piece 6. The screw threaded end of the screw engages screw threads 18 in the end piece 5. The end piece 5 has a perforated ear 19 projecting therefrom between its upper and lower surfaces, while the end piece 6 has an ear projected outwardly therefrom with one surface in a plane with the inner surface of the end piece. In this way, one shoulder 21 is provided on the end piece 6 and two shoulders 21 are provided on the end piece 5, and, at the same time, the two ears are spaced from each other and also from the outermost surfaces of the two end pieces or supporting means to provide seats on the upper and the lower side of the support. Openings 22 are provided in the ears 19 and 20 for the reception of the pivot fastener of the temple.

The temples, in this instance, are each formed of a wire of pliable material 7 and at its inner end is provided with three ears 9 arranged in parallel relation and provided with aligned openings 10 and also with projecting shoulders 9ª each in a plane with an ear 9. One of these openings is provided with a countersunk portion 11 in which the head 12 of a pivot screw 13 is seated, while the other opening is provided with screw threaded walls 14 with which the screw threads of the pivot screw engage. By this arrangement the temple may be as wide or wider at its pivoted end as at any point throughout its length, thereby making it possible to provide a heavier and stronger temple which is not weak or reduced adjacent its pivot.

The outermost ears 9 of the temple lie on the outer sides of the ears 19 and 20, while the innermost or middle ear of the temple lies between the ears 19 and 20. The outer faces of the outermost temple ears are flush with the outer faces of the end pieces or terminals or supporting means 5 and 6.

In the embodiment of the invention illustrated in Figs. 10 and 11, the support for the temple is in the form of a lens clamp 23 having ears 24 lying on opposite sides of the lens 1ª and secured by a screw fastener 25. The support 26 has two perforated ears 27 spaced from each other and from the upper and lower surfaces of the support to provide seats on the upper and the lower side of the support. The temple construction used with this embodiment is identical with Fig. 1, the projecting shoulders 9ª on the ears 9 of the temple engaging the shoulders 28 on the support 26 at the inner sides of the seats.

The present construction makes it possible to obtain a strong temple to support heavy lens frames, the lens frames now in use being large and much heavier than those formerly used and causing the breaking of the temple ears due to when only one ear is employed as is generally done. Furthermore, the temple ears serve to secure the two terminals together so that if the terminal securing screw becomes loose, the temple pivoting and securing screw will hold the lens frame against opening and consequent loss of the lens. A much stronger joint is obtained by this construction and the breaking of the temple at its connection with the ear is substantially eliminated. The three ears on the temple provide greater surface bearing on the lens frame and thereby prevent a wobblying connecting which permits the temple becoming loose. The temple has no weakened or reduced portion near its pivot and may be throughout its length as wide as the two end pieces or supporting means.

It will be noted that applicant's temple may be made extremely heavy in a horizontal direction as well as in a vertical direction, so that a temple of maximum strength may be obtained. In other words, it may be formed from cylindrical stock of uniform diameter throughout its length and this thickness may be as great as the support on which the temple is mounted.

What I claim as my invention and desire to secure by Letters Patent is:

1. In combination with a split lens frame having projecting end pieces at the split, each end piece being provided with an ear formed with an opening and the ears being spaced apart, a temple embodying a wire and three ears carried by the inner end of the wire, one of said ears lying between the ears of the end pieces and the other two lying on the outer sides of such ears, and a pivot screw passing through the ears of the temple and the ears of the end pieces.

2. An ophthalmic mounting comprising a split lens frame having end pieces, each provided with an ear formed with an opening, a screw for fastening said end pieces together, the ears when the two end pieces are fastened together lying spaced apart and also spaced from the outermost faces of the two end pieces, a temple wire and three ears on the temple wire, one of the outer ears having a countersunk opening and the other outermost ear of the temple having an opening with screw threaded walls, the inner ear lying between the two ears of the end pieces and the outermost ears lying on the outer sides of the ears of the end pieces, and a screw fastener having its head seated in the countersunk opening in one of the temple ears and anchored in the opening with the screw threaded walls of another ear of the temple.

3. In an ophthalmic mounting, the combination with a support having temple ear engaging seats spaced from the upper and lower surfaces of said support to provide shoulders on the inner sides of the seats, and a temple having at least two ears at the inner end thereof received on said seats and having their outermost faces flush with the upper and lower faces of the support, each of said temple ears having a projecting stop for engagement with the shoulders on the inner sides of the seats, and a fastener passed through said two ears and the support, said temple having a horizontal and a vertical thickness throughout its length at least as great as the distance between the upper and lower faces of said two ears and at least as great as the width of said two ears.

4. In an ophthalmic mounting, the combination with a temple having a wire and three spaced ears integral with said wire, of a supporting device extending outwardly from the lenses of the mounting and provided with two spaced ears, said ears being also spaced from the top and bottom surfaces of the supporting means, the middle temple ear being arranged in the space between the two ears of the supporting means, and the outside temple ears lying respectively above and below the ears of the supporting means, the outside surfaces of the outside ears of the temple being flush with the top and bottom surfaces of the supporting means.

HARRY W. GAGE.